United States Patent
Flosbach et al.

[19]

[11] Patent Number: 6,119,507
[45] Date of Patent: Sep. 19, 2000

[54] METHOD AND APPARATUS FOR RECOVERING HELIUM AFTER TESTING FOR LEAKS IN A SAMPLE HOLDER

[75] Inventors: Rudolf Flosbach, Wipperfurth; Joachim Klein, Cologne; Markus Nothhelfer, Kerpen, all of Germany

[73] Assignee: Leybold Vakuum GmbH, Cologne, Germany

[21] Appl. No.: 09/231,389

[22] Filed: Jan. 13, 1999

[51] Int. Cl.[7] ............................. B01D 15/08; F15B 1/02; G01M 3/20; F25J 3/00
[52] U.S. Cl. ............................................. 73/40.7; 73/49.2
[58] Field of Search ............................ 73/40.7, 49.2, 73/52, 40

[56] References Cited

U.S. PATENT DOCUMENTS

| | | | |
|---|---|---|---|
| 3,675,468 | 7/1972 | Caccamesi et al. | 73/40.7 |
| 3,740,962 | 6/1973 | Fan | 62/29 |
| 3,815,376 | 6/1974 | Lofredo et al. | 62/22 |
| 4,153,023 | 5/1979 | Asano et al. | 123/119 EC |
| 4,675,030 | 6/1987 | Czarnecki et al. | 55/16 |
| 4,688,627 | 8/1987 | Jean-Luc et al. | 165/11.1 |
| 4,701,187 | 10/1987 | Choe et al. | 55/16 |
| 4,717,407 | 1/1988 | Choe et al. | 62/18 |
| 4,984,450 | 1/1991 | Bürger | 73/40.7 |
| 5,172,583 | 12/1992 | Tallon | 73/40.7 |
| 5,224,350 | 7/1993 | Mehra | 62/17 |
| 5,248,473 | 9/1993 | Sommer et al. | 266/145 |
| 5,375,456 | 12/1994 | Burns | 73/40.7 |
| 5,390,533 | 2/1995 | Schulte et al. | 73/40.7 |
| 5,417,105 | 5/1995 | Martinez et al. | 73/40.7 |
| 5,625,141 | 4/1997 | Mahoney et al. | 73/40.7 |
| 5,728,940 | 3/1998 | Kim et al. | 73/40.7 |
| 5,786,529 | 7/1998 | Voss et al. | 73/40.7 |

FOREIGN PATENT DOCUMENTS

| | | |
|---|---|---|
| 4126676 | 2/1993 | Germany . |
| 19716749A1 | 10/1998 | Germany . |
| WO 9836815A1 | 9/1998 | WIPO . |

OTHER PUBLICATIONS

Engelhart, W.: "Automatische Dichtheitsprufanlagen fur die Kalte–Industrie", *Technisches Messen*, vol. 54, Mar. 1987, pp. 100–103.

*Primary Examiner*—Hezron Williams
*Assistant Examiner*—J. David Wiggins
*Attorney, Agent, or Firm*—Fay, Sharpe, Fagan, Minnich & McKee, LLP

[57] ABSTRACT

A helium supply unit (1) supplies helium from a high pressure storage (21) to fill a test chamber (6) which encloses a sample holder (5) to be examined for leaks by measuring device (2) including a mass spectrometer (3) and a control unit (4). The test gas is recovered after the testing by a pressure difference between a low pressure storage (18) and the test chamber (6). The test chamber is evacuated prior to receipt of the test gas by a vacuum pump (27) and after testing by a vacuum pump (34) for more complete helium recovery. The recovered test gas is then transmitted back to the high pressure storage (21) through a compressor (19), which raises the pressure of the recovered gas to a predetermined pressure, from the low pressure storage (18). The control unit (4) also controls a pure test gas supply (37) and a release valve (44). The concentration of the recovered test gas is measured and, if the concentration is too low, the control unit (4) releases the recovered test gas through valve (44) and admits fresh test gas from the supply (37) into the helium supply unit (1) at a point between the low pressure storage (18) and the compressor (19). In this manner, expensive test gases, such as helium, are recovered and reused.

19 Claims, 1 Drawing Sheet

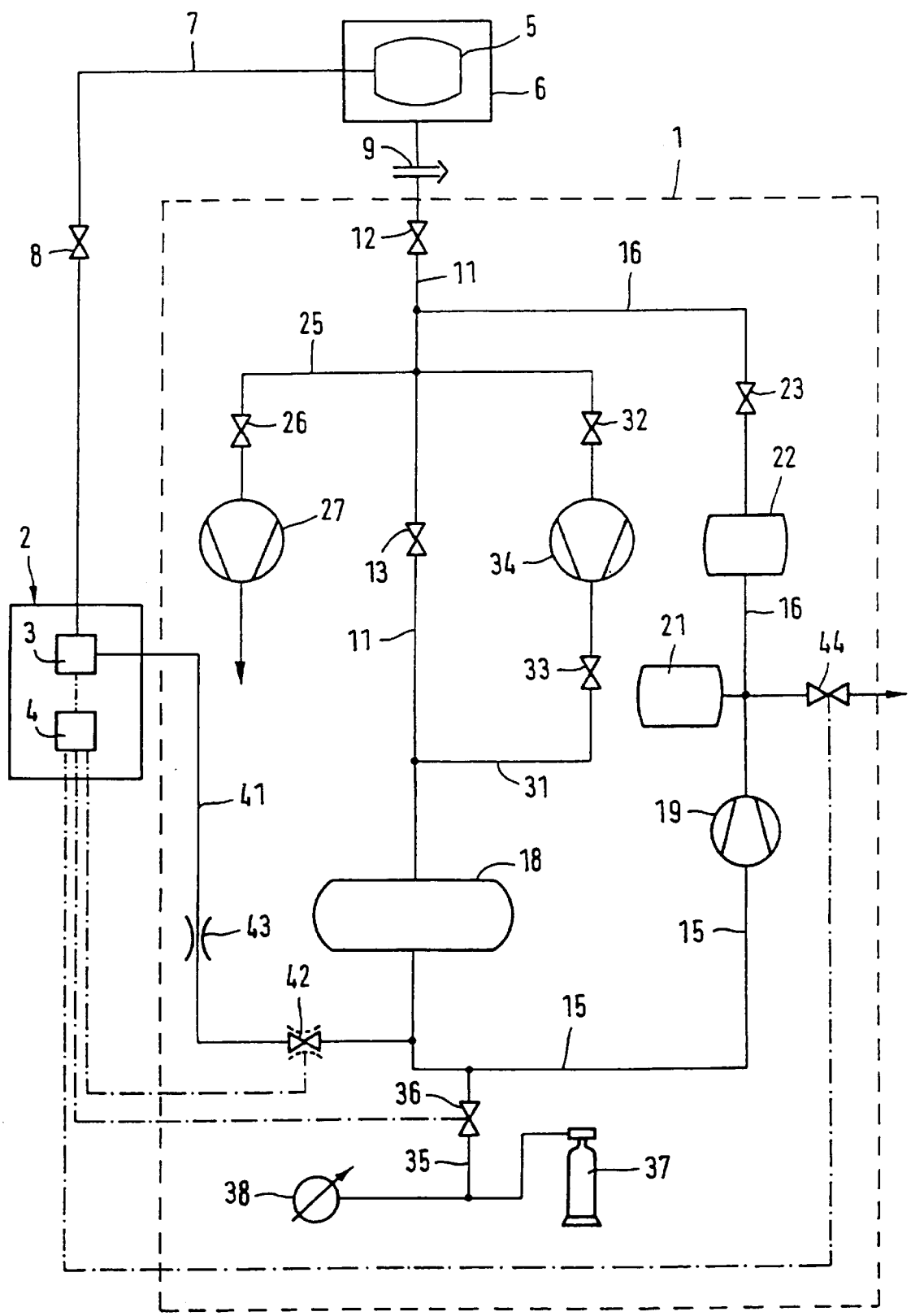

METHOD AND APPARATUS FOR RECOVERING HELIUM AFTER TESTING FOR LEAKS IN A SAMPLE HOLDER

BACKGROUND OF THE INVENTION

The present invention relates to the art of recovering test gases after they are used to test a sample holder for leaks. It finds particular application in recovering helium.

The use of helium is especially suited as the test gas, although the invention can be used with various other test gases. Helium is supplied to a test chamber until the helium fills a testing area.

To test a workpiece, such as a sample holder, for leaks a differential pressure is created across a workpiece. The test gas diffuses from the side having the higher pressure and to the side with the lower pressure. Any leaks are detected using a gas detector or sensor.

In the past, there have been two methods used to test for leaks in sample holders. In the first method, the sample holder is placed in a testing chamber or hood. Then, either the sample holder interior or test chamber is filled with helium. A test gas detector, i.e., a mass spectrometer, is connected to measure the inside of one or the other of the test chamber or the sample holder. If the sample holder contains holes allowing leakage, the leaking helium is detected by the mass spectrometer. Otherwise, if there is no leak, nothing is detectable.

In the second known method, the sample holder is filled with helium. Then, a leakage evaluation is performed by passing the probe of a leak detector over the outside surface of the sample holder.

In these prior art devices, the test gas which is used to determine if there are leaks in the sample holder permits sample gas to escape into the atmosphere.

Further, the helium supply unit connected to the sample holder or hood is basically only a helium supply. These procedures are quite costly because helium is very expensive as a test gas to have it all escape during testing. Also, there is a danger that the helium which escapes can be detected and result in false or erroneous results during any future or simultaneous leakage testing.

The present invention contemplates a new and improved apparatus and method which overcomes the above-referenced problems and others and provides a testing apparatus which recovers and reuses the test gas.

SUMMARY OF THE INVENTION

In accordance with the present invention, an apparatus and method is provided which, after a leak test is concluded, recovers helium in a low pressure storage. The recovered helium is compressed by a compressor and transferred back to a high pressure storage. This allows the helium gas to be reused to test for leaks again by transferring it again from the high pressure storage to the sample holder and/or test chamber.

According to another aspect of the invention, the pressure in the low pressure storage is selected to be lower than the high pressure storage and lower than the pressure in the sample holder and/or the test chamber. These pressure differences cause the flow of test gas from the high pressure storage, through the test chamber/sample holder, and to the low pressure storage.

According to a more limited aspect of the invention, steps are used to keep the helium consumption as small as possible. First, the test chamber or sample holder which will be filled with the helium is evacuated before initiating the leak testing. This avoids mixing foreign constituents into thy recovered test helium which would reduce the concentration of the helium. Second, in addition to using the pressure difference to empty the test gas from the sample holder or test chamber, there is an evacuation step to ensure that as much as possible of the test gas is transmitted to the low pressure storage.

A principle advantage of the present invention is that the cost of supplying helium for testing is reduced by reusing the recovered Helium, thereby reducing the amount of helium consumed in the testing.

Another advantage is that there is no helium escaping into the atmosphere surrounding the test area, reducing or eliminating false measurements.

Still further advantages of the present invention will become apparent to those of ordinary skill in the art upon reading and understanding the following detailed description of the preferred embodiment.

BRIEF DESCRIPTION OF THE DRAWING

The invention may take form in various components and arrangement of components and various steps and arrangement of steps. The drawing is only for purposes of illustrating a preferred embodiment and is not to be construed as limiting the invention.

The FIGURE illustrates schematically the components of a leak detector arrangement in combination with a helium providing unit.

DETAILED DESCRIPTION OF THE PREFERRED EMBODIMENT

With reference to the FIGURE, a leak testing arrangement is shown including helium handling unit 1 and a leak detector 2. The leak detector includes a mass spectrometer 3 and a control unit 4. It is appreciated that this is only one embodiment of the many leak detection systems that can be utilized and which are considered as falling within the scope of the present invention. A workpiece, such as a sample, specimen, or standard holder 5 to be examined, is positioned in a testing chamber 6. The interior of the sample holder 5 is connected to a conduit 7 which runs through a valve 8 and into the leak detector 2, more specifically the mass spectrometer 3. The interior of the test chamber 6 is connected to a connecting or feeder line 9 which is, in turn, connected to the helium or test gas handling unit 1. It is to be appreciated that for alternate embodiments the helium handling system can be connected to the interior of the sample holder and the mass spectrometer can be connected to the test chamber.

The connection line 9 is connected to a conduit 11 which runs through valves 12 and 13 of the helium handling unit 1. The conduit 11 is further connected to conduits 15 and 16 to form the system which allows the test gas used to test for leaks to be recovered and reused based on pressure differences in the system.

The conduit 11 connects the test chamber 6 to a low pressure storage 18. Next, conduit 15 connects the low pressure storage 18 with a compressor 19 whose output is connected to a high pressure storage 21. The conduit 16 connects the high pressure storage 21 with a pressure regulator 22 and then runs through a valve 23. Finally, the conduit 16 connects to the conduit 11 which, in turn, connects to connecting feeder line 9.

The conduit 11 is further connected between the valve 12 and a conduit 25 which, in turn, runs through a valve 26 and then into vacuum pump 27, whose function will be described in further detail below. Finally, the conduit 11 runs from the valve 12 to a valve 13. The conduit 11 is also connected to a bypass conduit 31 which runs through a valve 33, a vacuum pump 34, and a valve 32. The connection of the conduits 11 and 15 also connects to a conduits 35 which runs through a valve 36 to a helium supply 37 sand a pressure measuring instrument or gauge 38.

During the leak test only valve 8 is open, and all the remaining valves are closed. The helium pressure in the test chamber 6 typically is around 10 bar (145 psi). After the termination of the leak test, valve 8 is closed and the valves 12 and 13 are opened. Almost all of the helium streams out of the test chamber 6 and into the low pressure storage 18. The pressure is reduced to around 1 to 2 bar (14.5–29 psi). Then, the helium is drawn from the low pressure storage 18 by the compressor 19 through conduit 15. The compressor 19 compresses the helium to 16 bar (232 psi) and supplies it to the high pressure storage 21. To perform another leak test, the valves 23 and 12 are opened to connect the high pressure storage 21 to the testing chamber 6 and the valve 13 is closed. The pressure regulator 22 regulates the helium pressure in the test chamber 6 to any desired pressure, i.e., 10 bar (145 psi).

To maintain the helium concentration as high as possible, the chamber to be filled with the helium, in the illustrated embodiment, the test chamber 6, is evacuated to a low pressure e.g., to 10 mbar (0.295 in. of Hg). This is done through use of the vacuum pump 27 which is connected to the test chamber or hood 6 by opening the valves 12 and 26, only. When the selected vacuum is reached, the valve 26 is closed and the valve 23 is opened.

A complete recovery of the helium is accomplished through use of the vacuum pump 34. After the initial withdrawal of the helium is accomplished through the use of the pressure differential between the test chamber 6 and the low pressure storage 18, the valve 13 is closed and the valves 32 and 33 are opened. The vacuum pump 34 draws out the remaining helium reducing the helium loss to almost nothing, i.e., 10 mbar (0.295 in. of Hg).

There is, of course, a slight reduction in the concentration of the helium which may affect the measurements. Therefore, it is appropriate to measure the actual helium concentration periodically. The mass spectrometer 3 can be used to perform this measurement. To perform this periodic helium concentration measurement, a line 41 is connected between the conduit 15 and the mass spectrometer 3. The line 41 includes a valve 42 and a flow restrictor or pressure reducer 43. It is to be appreciated that the valve 42 could also regulate flow, as is demonstrated with the dashed-lines. The helium concentration can be measured by opening the valve 42, which is controlled by control unit 4, for a short period of time.

The leak measurement can include the measurement of the recovered helium concentration. A compensation in the sensitivity of the leak measurement can be made in accordance with the measured concentration of the helium. Alternately, concentration of the helium can be increased to preselected concentration. This is accomplished by opening the-valve 36 to allow helium to flow from supply 37 into the measuring system through conduit 15. The volume of helium newly admitted into the system can be offset by releasing an equal volume of less pure helium from the system through a valve 44.

The dash-dot-dash line represents control lines connecting the control unit 4 with the valves 36, 42, and 44 for automatically controlling the concentration measurement and the subsequent helium concentration adjustment.

The invention has been described with reference to the preferred embodiments. Obviously, modifications and alterations will occur to others upon reading and understanding the preceding detailed description of the preferred embodiment. It is intended that the invention be construed as including all such alterations and modifications insofar as they come within the scope of the appended claims or the equivalents thereof.

Having thus described the preferred embodiment, the invention is now claimed to be:

1. A method for recovering helium used to measure leaks during a work piece testing, the method comprising:
   supplying helium from a high pressure storage, in which helium is held at a higher pressure, to a testing area in which a workpiece is surrounded by an enclosure to fill one of (i) the workpiece or (ii) an area between the workpiece and the enclosure with helium;
   testing for helium in the other of (i) the interior of the workpiece or (ii) the area between the workpiece and the enclosure to test for leaks in the workpiece;
   after the testing has completed, drawing the helium to a low pressure storage where the low pressure storage is used for containing said recovered helium during a first stage of said recovery;
   compressing helium from the low pressure storage to at least the pressure of the high pressure storage; and,
   transferring the compressed helium to a high pressure storage for re-use to test for leaks during a second stage of said recovery, where said high pressure storage services as a source of recovered helium for future leak testing of any other workpieces.

2. The method according to claim 1, further including:
   before supplying the helium to the testing area, evacuating at least one of the workpiece and the area between the work piece and the enclosure.

3. The method according to claim 1, further including:
   reducing pressure in the testing area before each leak test to a pressure below the higher pressure in the high pressure storage.

4. The method according to claim 1, further including:
   maintaining the pressure in the filled one of the workpiece and the area between the workpiece and the enclosure higher than a pressure in the low pressure storage.

5. A method for recovering helium used to measure leaks during a work piece testing, the method comprising:
   supplying helium from a high pressure storage, in which helium is held at a higher pressure, to a testing area in which a workpiece is surrounded by an enclosure to fill one of (i) the workpiece or (ii) an area between the workpiece and the enclosure with helium to test for leaks in the workpiece;
   maintaining the pressure in the filled one of the workpiece and the area between the workpiece and the enclosure higher than a pressure in a low pressure storage;
   with a vacuum pump, pumping the helium from the filled one of the workpiece and the area between the workpiece and the enclosure to the low pressure storage until the pressure in the filled one of the workpiece and the area between the workpiece is below the pressure in the low pressure storage to improve helium recovery;
   compressing helium from the low pressure storage to at least the pressure of the high pressure storage; and,
   transferring the compressed helium to a high pressure storage for re-use to test for leaks.

6. The method according to claim 1, further including:
intermittently measuring a concentration of the helium.

7. The method according to claim 6, further including:
compensating a measurement made during the leak test in accordance with the measured concentration of helium.

8. A method for recovering helium used to measure leaks during a work piece testing, the method comprising:
supplying helium from a high pressure storage in which helium is held at a higher pressure, to a testing area in which a workpiece is surrounded by an enclosure to fill one of (i) the workpiece or (ii) an area between the workpiece and the enclosure with helium to test for leaks in the workpiece;
intermittently measuring a concentration of the helium;
in response to the measuring being a low concentration of the helium, discharging a portion of the helium and replacing the helium which is discharged with an equal portion of pure helium;
after the testing has completed, drawing the helium to a low pressure storage where the low pressure storage is used for containing said recovered helium;
compressing helium from the low pressure storage to at least the pressure of the high pressure storage;
transferring the compressed helium to a high pressure storage for re-use to test for leaks, where said high pressure storage services as a source of recovered helium for future leak testing.

9. The method according to claim 1 wherein:
the workpiece is a vessel for holding fluid, gaseous or liquid samples.

10. An apparatus for recovering helium used to measure leaks during a work piece testing, the apparatus including:
an enclosure enclosing a workpiece, one of the enclosure or the workpiece being connected through a first conduit to a high pressure gas storage to receive a test gas to test the workpiece for leaks;
a low pressure gas storage selectively connected through a second conduit with the one of the enclosure or the workpiece which received the test gas such that the low pressure gas storage receives the test gas after the testing is complete, the low pressure storage being used for containing said recovered helium during a first stage of said recovery;
a compressor connected with the low pressure gas storage and the high pressure gas storage through a third conduit for selectively compressing the test gas from the low pressure gas storage and supplying the compressed test gas to the high pressure gas storage, the high pressure storage being used for containing said recovered helium during a second stage of said recovery.

11. The apparatus according to claim 10, further including:
a vacuum pump connected with the one of the enclosure and the workpiece which receives the test gas for evacuating it prior to receipt of the test gas.

12. The apparatus according to claim 10, further including:
a vacuum pump connected between the low pressure storage and the one of the enclosure or the workpiece that receives the test gas for selectively pumping the test gas to the low pressure storage.

13. An apparatus for recovering helium used to measure leaks during a work piece testing, the apparatus including:
an enclosure enclosing a workpiece, one of the enclosure or the workpiece being connected to a high pressure gas storage to receive a test gas to test the workpiece for leaks,
a low pressure gas storage selectively connected with the one of the enclosure or the workpiece which received the test gas such that the low pressure gas storage receives the test gas after the testing is complete;
a test gas source connected with the low pressure gas storage for selectively adding test gas; and,
a compressor connected with the low pressure gas storage and the high pressure gas storage for selectively compressing the test gas from the low pressure gas storage and supplying the compressed test gas to the high pressure gas storage.

14. The apparatus according to claim 10, further including:
a test gas concentration measuring device connected with the low pressure gas storage for selectively measuring a concentration of the test gas.

15. An apparatus for recovering helium used to measure leaks during a work piece testing, the apparatus including:
an enclosure enclosing a workpiece, one of the enclosure or the workpiece being connected to a high pressure gas storage to receive a test gas to test the workpiece for leaks;
a low pressure gas storage selectively connected with the one of the enclosure or the workpiece which received the test gas such that the low pressure gas storage receives the test gas after the testing is complete to contain said recovered helium during a first stage of said recovery;
a test gas concentration measuring device including a mass spectrometer connected with the low pressure gas storage for selectively measuring a concentration of the test gas; and,
a compressor connected with the low pressure gas storage and the high pressure gas storage for selectively compressing the test gas from the low pressure gas storage and supplying the compressed test gas to the high pressure gas storage, during a second stage of said recovery.

16. The apparatus according to claim 10, wherein:
the test gas is helium.

17. The apparatus according to claim 10, further including:
a pressure regulator connected between the high pressure gas storage and the one of the enclosure and the workpiece that receives the test gas.

18. A method for recovering and reusing a test gas used to determine leaks in an object in a testing area, the method comprising:
evacuating the testing area of all traces of constituents using a first vacuum pump;
filling the testing area with the test gas by transmitting test gas from a high pressure device through a first conduit and connector to the testing chamber;
measuring the leaks from the object using a measuring device coupled to the testing area;
recovering substantially all the test gas through a second conduit connected between the testing area and a low pressure device through the connector by creating a difference in pressure between the testing area and the low pressure device;
evacuating the testing area after the test gas is recovered using a second vacuum pump connected to the second conduit;

transmitting the recovered test gas from the low pressure device to a compressor through a third conduit;

compressing the recovered test gas to a predetermined pressure to generate re-useable test gas; and, transmitting the re-useable test gas from the compressor to the high pressure device whereby the high pressure device can transmit this re-useable test gas to the testing area.

19. The method according to claim 18, further including:

using a control unit to measure the recovered test gas for a concentration value;

comparing the concentration value to a predetermined concentration value;

determining if the comparison is below a predetermined value, and, wherein if the concentration value is below a predetermined value, using the control unit to admit a volume of new test gas from a test gas supply into the third conduit while simultaneously releasing a same volume from the first conduit of the re-useable test gas.

* * * * *

UNITED STATES PATENT AND TRADEMARK OFFICE
CERTIFICATE OF CORRECTION

PATENT NO. : 6,119,507
DATED : Sep. 19, 2000
INVENTOR(S) : Flosbach et al.

It is certified that error appears in the above-identified patent and that said Letters Patent is hereby corrected as shown below:

Title Page, please insert the following priority information:

-- German Patent Application No. DE 19627922 A1 published January 15, 1998. --

Signed and Sealed this

Twenty-fourth Day of April, 2001

Attest:

NICHOLAS P. GODICI

Attesting Officer      Acting Director of the United States Patent and Trademark Office